May 23, 1944.   R. W. PEARSON ET AL   2,349,673
THERMOSTATIC PROTECTION OF IGNITRON TUBES
Filed May 20, 1941
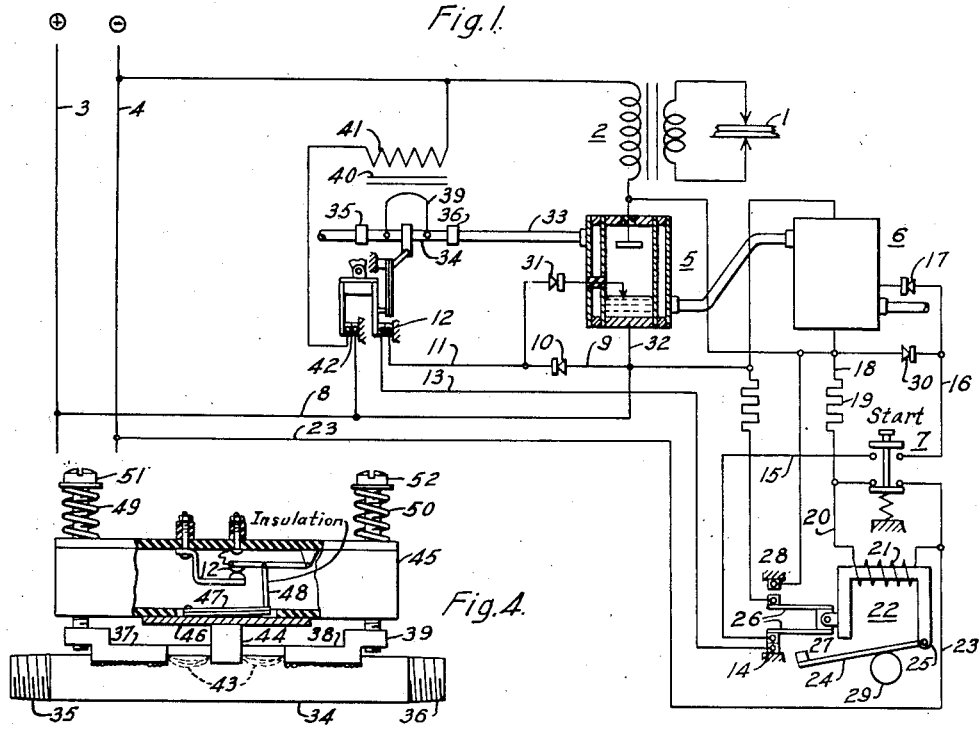
Fig.1.
Fig.4.
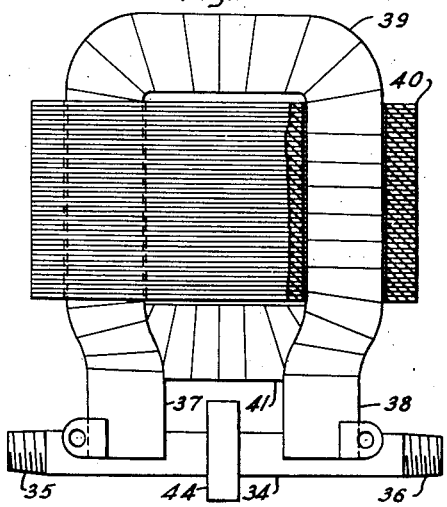
Fig.2.
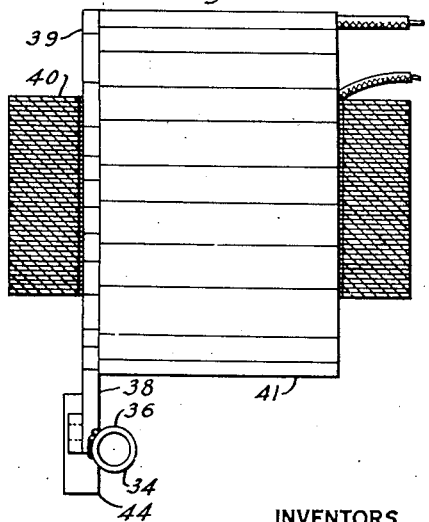
Fig.3.
WITNESSES:
N. F. Susser.
Wm. J. Ruano
INVENTORS
Robert W. Pearson and
Donald E. Marshall.
BY
Paul E. Friedemann
ATTORNEY Patented May 23, 1944

2,349,673

UNITED STATES PATENT OFFICE 2,349,673

THERMOSTATIC PROTECTION OF IGNITION TUBES

Robert W. Pearson, Wilkinsburg, Pa., and Donald E. Marshall, Allwood, N. J., assignors to Westinghouse Electric & Manufacturing Company, East Pittsburgh, Pa., a corporation of Pennsylvania Application May 20, 1941, Serial No. 394,397

16 Claims. (Cl. 250—27.5)

Our invention relates to an electric system embodying a thermal responsive element which is deflected in response to a change of rate of fluid flow through a conduit.

Our invention is specifically adapted for use in a cooling system such as a cooling system for an ignitron tube in which protection, that is, interruption of the igniter circuit is desired in the event of stoppage of flow of the cooling fluid through the system or even in response to a retardation of flow of such cooling fluid. It will be understood, however, that my flow responsive relay or detector means is of general application and can be applied in any system in which the flow of fluid through a conduit is the controlling feature.

An object of our invention is to provide a thermostatic element whose deflection is responsive to the rate of flow of fluid through an adjoining conduit portion.

Another object of our invention is to provide a protective control system for interrupting the igniter circuit of electric discharge tubes in the event that the cooling fluid, such as water, flows at a rate which is less than a predetermined value.

Another object of our invention is to provide a thermal responsive element which is responsive to heating current developed along a portion of a conduit of resistance material, which element is responsive to the rate of flow of fluid through the conduit portion because of the different cooling effects provided by the fluid on said conduit for different rates of fluid flow.

Another object of our invention is to provide a fluid flow responsive device which is relatively simple and inexpensive, yet highly reliable in operation.

Other objects and advantages will become more apparent from a study of the following specification when considered in conjunction with the accompanying drawing, in which:

Figure 1 is a schematic showing of a control system embodying the principles of our invention;

Fig. 2 is a top view partly in cross section of a transformer and fluid conducting conduit portion (the thermal responsive element being removed);

Fig. 3 is a lateral view of the structure shown in Fig. 2; and

Fig. 4 is a front view partly in cross section of a thermal responsive unit showing the manner in which it is mounted upon the fluid conducting conduit portion.

Referring more particularly to Figure 1 of the drawing, numeral 1 denotes a pair of workpieces which are to be spot-welded together by the energy furnished by transformer 2. Terminals 3 and 4 denote a source of alternating current potential for energizing said transformer and for energizing a plurality of ignitron tubes 5 and 6. Fig. 1 shows an ignitron circuit including a timer, which circuit has been shown and claimed in a copending application of E. H. Vedder and R. W. Staggs, Serial No. 214,160, filed June 16, 1938, and entitled Discharge apparatus. However, the circuit will be briefly described as follows: Assume that the "start" switch 7 is depressed. A circuit will then be completed from terminal 3 through conductors 8 and 9, rectifier 10, conductor 11, thermostatic contact members 12, conductor 13, contact members 14, conductor 15, the upper contact members of the "start" switch 7, conductor 16, rectifier 17, igniter electrodes of ignitron tube 6, conductor 18, resistor 19, conductor 20, coil 21 of the time limit relay 22, conductor 23 to the terminal 4. Inasmuch as the short circuit normally provided for coil 21 by the lower contact members of switch 7 is interrupted (by the depression of the "start" switch), relay coil 21 will become fully energized and will attract armature 24, which is pivoted at point 25, upwardly until the left-hand end thereof lifts the contact carrying arms 26, pivoted on hinge 27, upwardly so as to effect opening of contact members 14 and closing of contact members 28. The time required for this upward movement of armature 24 can be varied by adjusting the initial position of armature 24 which is done by the stationary adjustable cam element 29. As soon as contact members 14 are interrupted, the igniter circuit previously traced will be interrupted. The above traced circuit applies at the moment terminal 3 is positive with respect to terminal 4, at which time tube 6 fires, whereas tube 5 does not. In the next half-cycle, when the terminal 4 is positive with respect to terminal 3, the circuit may be traced from terminal 4 through conductor 23, coil 21, conductor 20, resistor 19, conductor 18, rectifier 30, conductor 16, the upper contact members of the start switch 7, conductor 15, contact members 14, conductor 13, contact members 12, conductor 11, rectifier 31, the igniter electrode and cathode of tube 5, conductor 32, and conductor 8 to terminal 3. At this moment tube 5 is ignited or fires, whereas tube 6 does not. In this manner with successive reversals or alterations of the alternating current source, alternate firing of the tubes 5 and 6 is effected.

If a timer is not desired, as in certain brazing operation, a manually operated switch may be substituted therefor. Such switch would be connected between leads 13 and 16.

The essence of our invention centers about the construction shown in Figs. 2, 3, and 4 in the manner in which such construction is applied in the circuit shown in Fig. 1. As shown in Fig. 1, a conduit or tubing 33 carries cooling fluid, such as water, which fluid flows about the jackets of tubes 5 and 6 or may flow in any other desired portion of the tubes. An element of conduit 33, namely, 34, is made of electrical resistance material or is made of conductive material such as steel or even copper but having a very thin wall so as to present appreciable electrical resistance. Element 34 terminates at points 35 and 36 (see also the remaining figures). As shown more clearly in Fig. 2, the conduit element 34 of resistance material has welded or brazed at longitudinally spaced points thereof the extremities 37 and 38 of a loop 39 of conductive material, which loop is wound on a core 40 of a transformer. A primary winding 41 of said transformer is also wound on the core and is indicated in the circuit of Fig. 1. It will, therefore, be seen that the primary winding 41 which is in series with contact members 42 comprises a source of energy for heating the resistance portion 34 of the conduit, inasmuch as such portion 34 comprises a part of a single turn, secondary of the transformer. It should be noted that the secondary is not restricted to a single turn but may have several turns if so desired. The logical method of connection of the loop extremities 37 and 38 appeared to be in the form of straps wound about longitudinally spaced portions of the conduit portion 34. Such method of connection, however, has been found by us to have an outstanding disadvantage, namely, that the heat is uniformly developed along all portions of the surface of the conduit portion 34. Hence, it is difficult to make optimum use of changes of temperature of the conduit element 34. In order to overcome this difficulty, we have brazed or otherwise integrally connected the extremities 37 and 38 of loop 39 to only a portion of the perimeter of conduit element 34, which is shown more clearly in Fig. 3. By virtue of such connection to only a portion of the perimeter of the conduit element, we are able to confine the greatest portion of the emission of heat to a well defined path indicated by the dotted lines 43 in Fig. 4. Such hot spot or heat concentrating path is made possible due to the fact that the tube element 34 is not only of high electrical resistance, but inherently possesses a low coefficient of heat conduction. Therefore, the heat developed at the hot spots 43 will not travel along the tubing rapidly. Hence less heated area is exposed to the cooling water which allows the heated area or hot spots to become hotter, thus making the thermal responsive element, which is to be described hereinafter, very fast in response, so fast indeed as to be able to detect not only water flow failure, but water slow-down as well in ample time to adequately protect the ignitron tubes or other devices.

In order to facilitate conduction of heat from the hot spot 43 to the thermal responsive element, a block of copper or other suitable conducting material 44 is brazed or otherwise securely mounted on an intermediate portion of the heat concentrating path 43. A housing 45 having a metallic base 46 encloses a thermal responsive element or thermostat 47 which is directly mounted on and in metallic contact with said metallic base 46. An insulating pin 48 is provided to effect separation of contact members 12 and 42 (the latter not being observable in Fig. 4 inasmuch as it is located directly behind contact members 12). It will thus be seen that a direct metallic path between the conduit element 34 and the thermostat element 47 is provided so as to facilitate heat flow from hot spot 43 to thermostatic element 47, thereby making the latter quickly responsive to temperature changes in the hot spot or heat concentration path 43. It will be noted that the temperature of thermostatic element 47 is dependent upon two components, namely, the temperature of the cooling fluid in conduit 34 and the heat energy developed in resistance element 34 as the result of electric current flow therethrough. Another outstanding feature of our construction is that very little wasted heat or heat loss will be developed on the remaining surface of conduit element 34 (outside of hot spot 43). The above described construction makes it possible to have a minimum separation between extremities 37 and 38 of the secondary loop 39, as a result of which a relatively small transformer will suffice for furnishing the necessary power for obtaining sufficient heating to actuate the thermal responsive element 47. The housing 45 is resiliently held against the upper surface of the element 44 by virtue of the springs 49 and 50 which are compressed between the heads of bolts 51 and 52, and the top surface of the housing. It will thus be seen that any predetermined and constant contact pressure between elements 44 and 46 can be obtained merely by screwing down the bolts 51 and 52. In addition, such structure provides a readily removable and replaceable housing 45 in the event that the thermal element becomes either defective or necessitates a change of rating.

While, for simplicity, contact members 12 are shown as directly interrupting the igniter circuit, it will become readily apparent that a relay may be added with an additional, larger current capacity switch if so desired.

While our invention has been described as being applicable to a spot-welding system, it will be readily apparent that it is of general application and may be applied to any system which involves the flow of a fluid through a conduit and which must be responsive to such flow. Our invention is applicable to any cooling system whatsoever wherein a predetermined operation is desired upon the occurrence of retardation or stoppage of fluid flow through the system, or upon the increase in temperature above a predetermined level of the fluid.

The term "fluid" as used throughout the specification and claims is intended to include both liquids and gases, either as a refrigerating medium or even as a heating medium in some cases. In other words, our thermal responsive element is generally responsive to any heat change caused by change of rate of flow of a fluid through a conduit.

While our invention has been described as relating to a relay, it will be apparent that the deflections of the thermostatic elements constitute a visual indicating or detecting means which will indicate the rate of flow of fluid. Any suitable means (not shown) may be used to amplify the movement or deflection of the thermostatic element so as to be readily visible to the operator. For example, pin 48 may be extended through the top of the housing and calibrated to indicate rate of flow or temperature of the fluid. Of course signal lamps (not shown) or other signal devices may be energized as the result of attainment of a predetermined rate of flow of the fluid.

We are, of course, aware that others, particularly after having had the benefit of the teachings of our invention, may devise other devices embodying our invention, and we, therefore, do not wish to be limited to the specific showings made in the drawing and the descriptive disclosure hereinbefore made, but wish to be limited only by the scope of the appended claims and such prior art that may be pertinent.

We claim as our invention:

1. An electric control system responsive to the rate of flow of a fluid medium flowing through a conduit comprising, in combination, a conduit having electrical resistance and through which a fluid medium is adapted to flow, an electric heating circuit including a portion of said conduit, and thermal relay means adjacent said conduit portion and responsive to temperature changes of said conduit portion as the result of change of the rate of flow of the fluid through the conduit.

2. An electrical control system responsive to the rate of flow of a fluid medium flowing through a conduit comprising, in combination, a conduit having electrical resistance and through which a fluid medium is adapted to flow, an electric heating circuit including a transformer having a primary winding and having a secondary winding connected across a portion of said conduit to produce heat therein, and thermal relay means adjacent said conduit portion and responsive to temperature changes of said conduit portion as the result of change of the rate of flow of the fluid through the conduit.

3. An electric relay which is responsive to the rate of flow of a fluid through a conduit comprising, in combination, an electric heating circuit including a transformer having primary and secondary windings, a tubing for conducting a flow of fluid therethrough, a length of said tubing having appreciable electrical resistance and being electrically connected across said secondary winding, and a heat responsive relay element mounted on said length of tubing and being responsive to temperature changes of a portion of said tubing resulting from changes of the rate of flow or of the temperature of fluid through the tubing.

4. In a relay as set forth in claim 3, a housing enclosing said relay element and having a metallic base portion, said housing being supported longitudinally at the extremities of said length of tubing, and a heat conductive metallic element which metallically connects an intermediate portion of said length of tubing with said metallic base portion of said housing to enhance heat flow thereto.

5. In a relay as set forth in claim 3, a housing enclosing said relay means and including a metallic base portion, a pair of metallic support members for holding said housing, each integrally formed on a portion of the periphery of said tubing in order to concentrate the heat flow in a defined path at the extremities of said length of tubing, and a heat conductive metallic element which metallically connects an intermediate portion of said length of tubing with said base portion of said housing to enhance heat flow thereto.

6. A cooling system for electric discharge tubes comprising, in combination, an electric discharge tube, a fluid conducting conduit system for passing a cooling fluid for cooling a portion of said tube, said conduit system including a conduit portion spaced from said tube and having appreciable electrical resistance, a control system including said tube and including a transformer having primary and secondary windings, said conduit portion forming an electrically heated resistance path across said secondary winding, a thermal responsive relay element mounted adjacent said conduit portion and being responsive to changes of temperature of said tube portion resulting from changes in the rate of flow of said fluid therethrough, and contact members operable by said relay element to interrupt said control system upon occurrence of a predetermined retardation in the rate of flow of said cooling fluid.

7. A control system as set forth in claim 6 in which said secondary winding together with said conduit portions form a single loop or turn.

8. An electric system including a thermostat element the position of which is indicative of the rate of flow of fluid through a conduit comprising, in combination, a conduit for conducting a flow of fluid therethrough, a length of said conduit having appreciable electrical resistance, a metallic conductor element formed as a single loop with its extremities metallically connected to the extremities of said conduit length, an electric circuit including a transformer having a primary winding, said loop and conduit length together forming a single turn secondary winding of said transformer for furnishing electrical heating energy to said conduit length, a thermostat element mounted adjacent said conduit length and which is deformed in response to temperature changes of said conduit length caused by variations in the rate of flow of fluid through said conduit portion.

9. An electric system as set forth in claim 8 in which said thermostat is enclosed in a housing, a metallic base in said housing for supporting said thermostat, and conductor means metallically connected to an intermediate portion of said conduit length of said metallic base to more readily transmit heat thereto.

10. An electric system as set forth in claim 8 in which said thermostat is enclosed in a housing, a metallic base in said housing for supporting said thermostat, and conductor means metallically connected to an intermediate portion of said conduit length of said metallic base to more readily transmit heat thereto, said looped conductor element having its extremities integrally connected to only a small portion of the conduit perimeter at the extremities of said conduit length so as to concentrate the heat along a longitudinal path adjacent said housing metallic base.

11. An electric control system responsive to the rate of flow of a fluid medium through a conduit, comprising in combination a main circuit to be controlled, a conduit having electrical resistance and through which a fluid medium is adapted to flow, an electrc heating circuit including a transformer having a primary winding and having a secondary winding connected across a portion of said conduit to produce heat therein, thermal relay means adjacent said conduit portion and responsive to temperature changes of said conduit portion as the result of change of the rate of flow of the fluid through the conduit, and a pair of switches, one being connected in series with said primary winding and the other being connected in said main circuit for deenergizing said primary winding and controlling said main circuit respectively upon response of said relay means.

12. The combination with a heat developing device having cooling means including a conduit through which a cooling fluid medium is adapted to flow, of heating means thermally separated from said device for supplying heat to a portion of said conduit, and temperature-responsive control means heat-conductively connected to said portion so as to respond to the temperature produced by said heating means in said portion and determined by the heat-dissipating condition of the fluid medium flowing through said conduit for interrupting the operation of said heating device upon occurrence of a given change in said condition.

13. The combination with a conduit through which a fluid medium is adapted to flow, of means for controlling an electric circuit in dependence upon changes in thermal condition of said flowing medium comprising an electric resistance element in heat-conductive contact with said flowing medium, electric circuit means connected with said element for producing therein a temperature dependent upon the heat dissipation due to said contact with said medium, and temperature-responsive circuit control means heat-conductively connected with said element to respond to changes of said element temperature.

14. With a cooling system containing a flowing cooling medium, the combination of means for controlling an electric circuit in dependence upon changes in thermal condition of said flowing medium comprising a conduit portion forming an electric resistance element and being arranged in said system so as to be traversed by said cooling medium, an electric heating circuit including said conduit portion for producing in the latter a temperature dependent upon the heat dissipation due to said medium, and temperature-responsive circuit control means heat-conductively connected with said conduit portion to respond to changes of said temperature.

15. With a heat developing electric device having an operating circuit, the combination of a conduit system containing a flowing medium for cooling said device, an electric resistance element disposed in heat-conductive contact with said medium, a heating circuit connected with said element for producing therein a temperature dependent upon the heat dissipation due to the contact with said medium, said element being spaced from said device so that the temperature of the latter is substantially independent of that of said element, and temperature-responsive control means electrically connected to said operating circuit for controlling the latter and heat-conductively connected with said element to respond to changes of said temperature of said element.

16. With a heat developing electric device having an operating circuit, the combination of a conduit system containing a flowing medium for cooling said device, heating means locally arranged in said system in heat transferring contact with said medium and thermally separate from said device so as to assure a temperature depending upon the degree of heat transfer to said medium, and temperature-responsive control means electrically connected to said operating circuit for controlling the latter and heat-conductively connected with said heating means to respond to changes of said temperature.

ROBERT W. PEARSON.
DONALD E. MARSHALL.